G. J. BROMHEAD.
TIRE INFLATING DEVICE.
APPLICATION FILED JUNE 12, 1917.
1,263,517.
Patented Apr. 23, 1918.
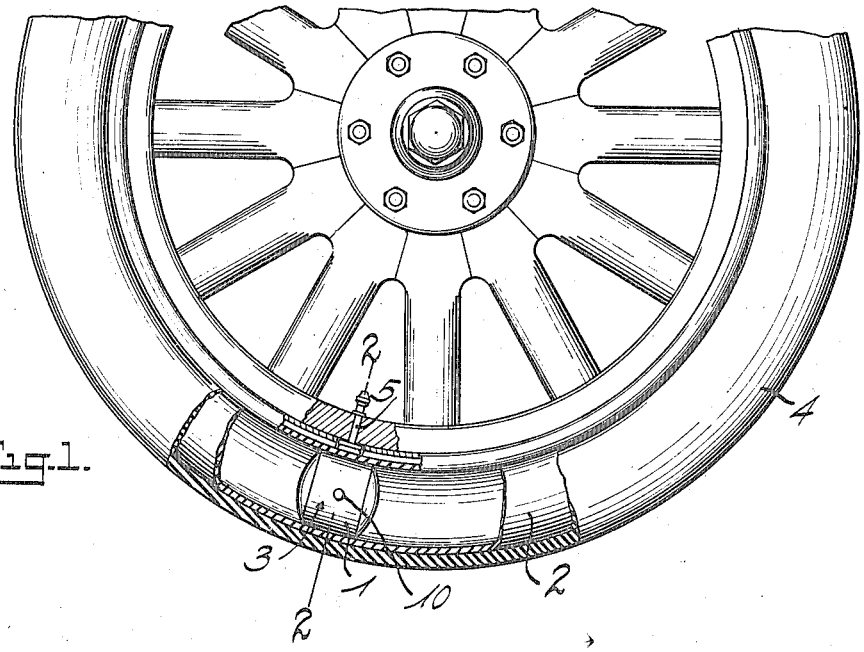
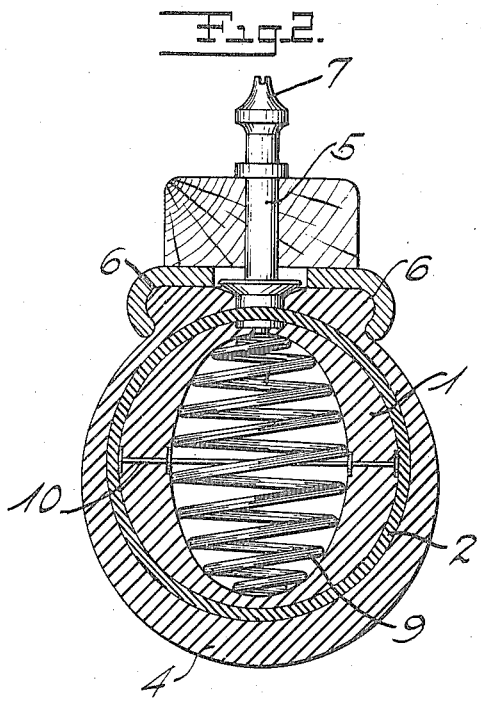
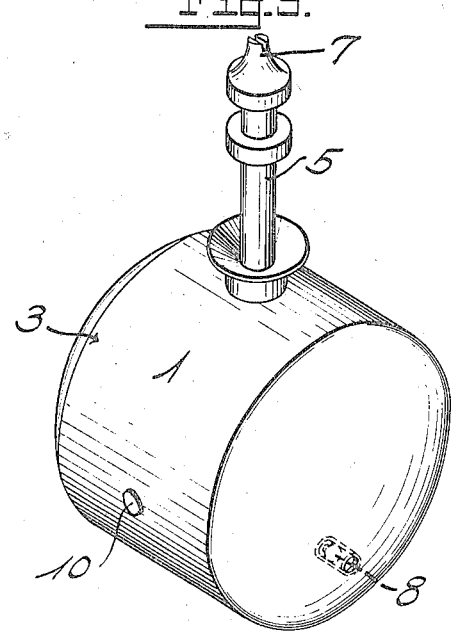
Inventor
GEORGE J. BROMHEAD.
By his Attorney
Dudley B. Howard

UNITED STATES PATENT OFFICE.

GEORGE J. BROMHEAD, OF NEW YORK, N. Y.

TIRE-INFLATING DEVICE.

1,263,517.  Specification of Letters Patent.  Patented Apr. 23, 1918.

Application filed June 12, 1917. Serial No. 174,260.

*To all whom it may concern:*

Be it known that I, GEORGE J. BROMHEAD, a citizen of the United States of America, residing at 1328 Chisholm St., New York, in the county of Bronx and State of New York, have invented new and useful Improvements in Tire-Inflating Devices, of which the following is a specification.

This invention relates to pneumatic tires and in particular to an inflating device adapted to be contained entirely within the tire and which will automatically inflate the latter with air during its active use on the wheel of a vehicle.

The primary object of the invention is to provide a device of this character which will derive its motion from the intermittent compression or flattening of a certain portion of the tire by the weight of the vehicle during the travel of the latter, and which operates efficiently under a minimum degree of tire compression.

The invention consists specifically in the construction and arrangement of parts described in the following specification and illustrated in the annexed drawing, in which:

Figure 1 is a side elevation, partly in section, of part of a wheel and tire having the improved inflating device embodied in the construction of the latter;

Fig. 2 is a transverse sectional view through the same on line 2—2 of Fig. 1; and Fig. 3 is a perspective view of the flexible pumping bulb when separated from the inner tube of the tire.

Referring to the drawings by reference characters, 1 designates the elastic pumping bulb which is positioned inside the inner tube 2. This bulb is preferably constructed of tough rubber and is substantially cylindrical in shape. Its outer side faces 3 are, because of this particular shape, adapted to fit the inner faces of the inner tube snugly throughout a considerable area when the latter in inflated and presses against the tire casing or shoe 4. The end faces are spheroidal.

A valved inlet tube 5 projects from the bulb through the wheel rim 6. Where this tube penetrates the inner tube, the latter is vulcanized to the bulb so as to insure an air-tight joint. The inlet tube is of the construction usually employed in pneumatic tires and has the customary dust-proof cap 7.

A valved outlet 8 for the bulb is provided at a suitable point and communicates with the interior of the inner tube.

In order to lend added resiliency to the bulb, a coil spring 9 may be provided inside the bulb, as shown, with its axis disposed radial to the wheel axis.

A transverse side brace, which is preferably in the form of a metallic wire 10, extends between the sides of the bulb 1 and has its ends anchored in the latter about midway between the wheel rim and tire tread. The length of this brace is such that it maintains the width of the bulb practically normal, even during radial compression of the latter. This restraining effect results in maximum air compression within the bulb for a given degree of reduction in the radial thickness of the part of the tire in which the bulb is located.

The operation of the device will now be described. As the wheel turns, the weight of the vehicle will in part bear upon the bulb once during each revolution, whereby it is compressed radially with respect to the wheel axis, against the tension of spring 9. Air is consequently forced through the valved outlet 8 into the inner tube. As the wheel turns farther and the portion of the tire containing the bulb leaves the ground, the bulb will expand to its normal size through the action of the spring and because of its inherent elasticity. Air will thus be sucked into the bulb through the valved inlet 5.

This pumping action will continue until the tire has been inflated to the desired pressure, when the air in the bulb and that in the tube will be in a state of equilibrium.

The advantages of the particular external configuration of the bulb should be pointed out, however. The bulb will adhere very closely to the inner surfaces of the inner tube throughout an appreciable part of its length, thereby preventing circumferential displacement of the bulb in the tube. At the same time, what may be termed the end faces of the bulb are substantially spheroidal and merge so gradually into the cylindrical side faces that there will be no danger of the inner tube being cut by the bulb.

The device as a whole is thus very durable and efficient as a labor saver.

Having thus described the invention, what I claim and desire to secure by Letters-Patent is:

1. The combination with an inflatable tire tube, of an elastic bulb adapted to be compressed with the tire and having a valved inlet communicating with the atmosphere and a valved outlet communicating with the interior of the tire tube, and a brace member connecting the opposite sides of the bulb to restrain the same against lateral expansion.

2. The combination with an inflatable tire tube, of an elastic bulb adapted to be compressed with the tire and having a valved inlet communicating with the atmosphere and a valved outlet communicating with the interior of the tire tube, and a brace wire extending transversely between the opposite sides of the bulb and having its ends anchored in the latter.

3. A pumping device for pneumatic tires comprising an elastic bulb having a valved inlet and a valved outlet, and a brace member connecting the opposite sides of the bulb to restrain the same against lateral expansion.

In testimony whereof I have signed my name to this specification in the presence of two subscribing witnesses.

GEORGE J. BROMHEAD.

Witnesses:
GRACE E. FACKLER,
ELIZABETH FACKLER.